United States Patent
Nobusawa

[11] 3,726,194
[45] Apr. 10, 1973

[54] CAMERA SHUTTER MECHANISM

[75] Inventor: Tsukumo Nobusawa, Tokyo-to, Japan

[73] Assignee: Asahi Kogaku Kogyo Kabushiki Kaisha, Tokyo-to, Japan

[22] Filed: July 7, 1969

[21] Appl. No.: 839,535

[30] Foreign Application Priority Data

July 12, 1968 Japan..................................43/48441
July 12, 1968 Japan..................................43/58944

[52] U.S. Cl................................95/10 CT, 95/53 EA
[51] Int. Cl..............................G03b 7/08, G03b 9/62
[58] Field of Search..................95/10 C, 53 R, 53 E, 95/53 X, 53 UX; 250/214 P

[56] References Cited

UNITED STATES PATENTS

| | | | |
|---|---|---|---|
| 3,593,637 | 7/1971 | Fahlenberg | 95/53 EA |
| 3,092,002 | 6/1963 | Frenk | 95/58 |
| 3,526,181 | 9/1970 | Fahlenberg et al. | 95/53 EA |
| 3,520,391 | 7/1970 | Graham et al. | 95/53 EA |
| 3,348,460 | 10/1967 | Schmitt | 95/53 X |
| 3,362,310 | 1/1968 | Kitai | 95/53 X |
| 3,348,462 | 10/1967 | Fahlenberg | 95/53 R |
| 3,512,000 | 5/1970 | Powell | 95/10 C X |
| 3,349,678 | 10/1970 | Suzuki et al. | 95/53 X |
| 3,324,779 | 6/1967 | Nobusawa et al. | 95/10 C X |
| 3,347,141 | 10/1967 | Nobusawa et al. | 95/53 X |

Primary Examiner—John M. Horan
Assistant Examiner—Russell E. Adams, Jr.
Attorney—Stanley Wolder

[57] ABSTRACT

An automatic shutter timing mechanism includes a shutter opening release electromagnet controlled by a first solid state switch and a shutter closure release electromagnet controlled by a second solid state switch. A relaxation pulse output oscillator includes a unijunction transistor and a period control timing network comprising a light exposed photoconductor and one or more timing capacitors selectively connected in series with the photoconductor. The solid state switch inputs are coupled to the oscillator so that one pulse actuates the first switch and the second pulse actuates the second switch which is enabled by the actuation of the first switch. The solid state switch and electromagnets are energized by a common voltage source.

11 Claims, 7 Drawing Figures

PATENTED APR 10 1973
3,726,194
SHEET 1 OF 3
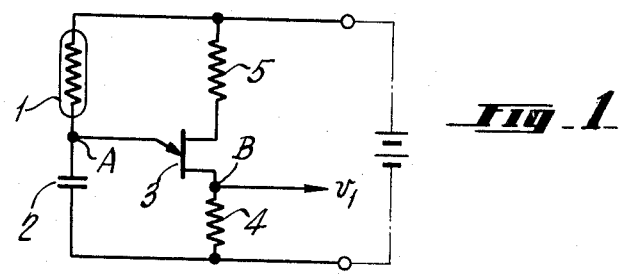
Fig. 1
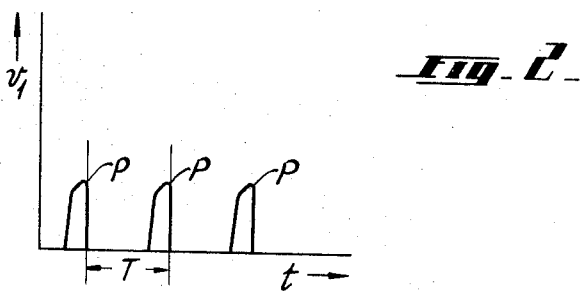
Fig. 2
Fig. 3
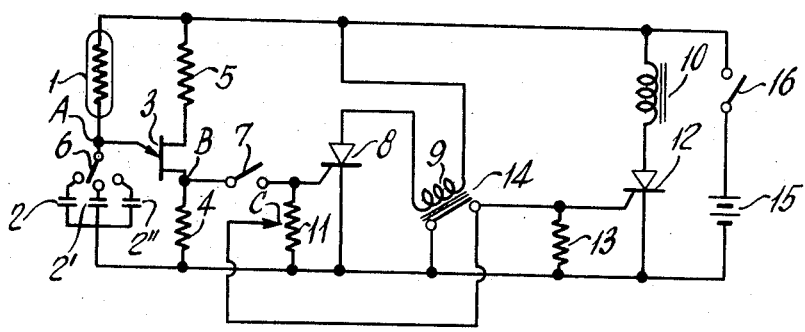
INVENTOR
TSUKUMO NOBUSAWA
BY Stanley Wolder
ATTORNEY

3,726,194

CAMERA SHUTTER MECHANISM

BACKGROUND OF THE INVENTION

The present invention relates generally to improvements in camera shutter mechanisms and it relates particularly to an improved light responsive automatically electrically timed and controlled camera shutter.

Many types of automatic shutters have been proposed wherein the exposure time is controlled by a transistor timer including an RC timing circuit comprising the combination of a photoconductor exposed to the light from the object to be photographed and a timing capacitor, and these have been widely used. The automatic shutters of the above conventional type, however, are frequently inaccurate in the control of the exposure time due to factors such as a variation of the source voltage, variations in ambient temperature and in the mechanical delay of the electromagnetic mechanism for starting the shutter closure. Since film of narrower exposure tolerance or allowance, for example, color film is now widely employed, an automatic electric shutter capable of exposure time control of very high accuracy is necessary for proper results.

In the electric shutter of the conventional types the shutter opening is accomplished by a mechanically actuated release mechanism, for example, a shutter button, while the shutter closure is started by an electromagnetic mechanism under the control of an electric timer. With such an electric shutter of conventional type in which the shutter opening is accomplished by a mechanical starting operation, however, the shutter opening is properly accomplished but the shutter closure fails to be initiated at the proper time in case, for example, that there is a drop in the voltage of the source battery of the electrically operated section for control of the shutter closure time, due to consumption of said source battery. To compensate for this drawback, a source voltage check meter has been incorporated into the electric shutter of the conventional type whereby the condition of the source voltage may be recognized before the photographing operation. On the other hand, with such an electric shutter of the conventional type in which shutter closure is started by an electromagnetic mechanism, the delay time involved in operation of said mechanism has had to be taken into consideration for the shutter contrl operation, a highly undesirable procedure.

SUMMARY OF THE INVENTION

It is a principal object of the present invention to provide an improved camera shutter control mechanism.

Another object of the present invention is to provide an improved light responsive automatically timed camera shutter.

Still another object of the present invention is to provide an improved camera shutter release timing network which is substantially independent of the network energizing voltage within the working range thereof.

A further object of the present invention is to provide a light responsive shutter control mechanism which blocks the opening of the shutter in the absence of a proper energizing voltage.

Still a further object of the present invention is to provide a shutter control network of the above nature characterized by its accuracy, stability, reliability, simplicity and versatility.

The above and other objects of the present invention will become apparent from a reading of the following description taken in conjunction with the accompanying drawings which illustrate preferred embodiments thereof.

In a sense the present invention contemplates the provision of mechanism for sequentially controlling the opening and closing of a camera shutter comprising a first control network, an electromagnetic shutter opening release device responsive to said first control network, a timing network, a second control network responsive to said timing network, an electromagnetic shutter closing release device responsive to said second control network, and a common voltage source for energizing said control networks and shutter release devices.

Another feature of the present invention resides in the provision of a timing circuit, one element of which may be light responsive, which controls the period of a periodic pulse generator such as relaxation oscillator. A pulse from the generator triggers a first solid state switch which energizes the shutter opening release electromagnet and enables a second solid state switch which is triggered by the next pulse which energizes the shutter closure release actuating electromagnet.

In its preferred form the pulse generator is a relaxation oscillator including a unijunction transistor with a timing circuit including a photoconductor and a group of timing capacitors selectively connected in series therewith. The solid state switches are silicon controlled rectifiers the second switch being biased to an inoperative state and being enabled upon conduction of the first silicon controlled rectifier.

The improved control mechanisms are simple, rugged, stable, accurate and reliable. The period of the pulse generator being substantially independent of the source voltage and the release actuating electromagnets being equally dependent on the source voltage and hence being mutually compensating, the timing accuracy of the shutter exposure is uniformly high under varying conditions. Moreover, such accuracy is not significantly affected by variations in ambient temperature.

BRIEF DESCRIPTION OF THE DRAWINGS

FIG. 1 is a circuit diagram of a periodic pulse generator section in an automatic shutter embodying the present invention;

FIG. 2 is a chart illustrating the operating characteristic of the pulse generator of FIG. 1;

FIG. 3 is a circuit diagram illustrating an embodiment of a shutter control mechanism embodying the present invention;

DESCRIPTION OF THE PREFERRED EMBODIMENTS

Figure 4:
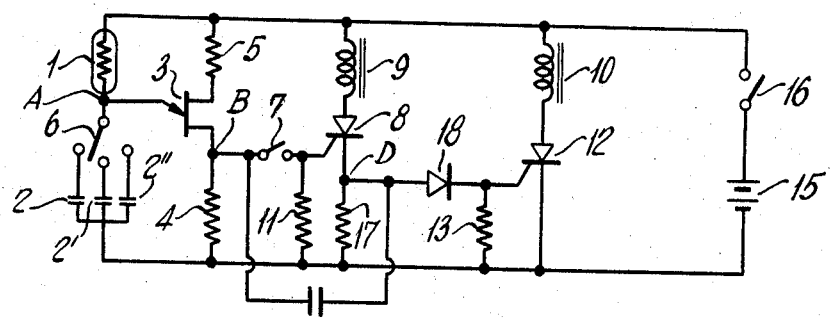
FIG. 4 is a circuit diagram of another embodiment of the present invention.

Referring now to the drawings which illustrate preferred embodiments of the present invention, a photoconductor 1 is exposed and responsive to the illumination intensity of an object to be photographed and is connected in series with a capacitor 2 and is included in a current source circuit of voltage V so as to constitute a timing circuit. The emitter of a unijunction transistor 3 is connected to the junction point A of photoconductor 1 and capacitor 2 and resistors 4 and 5 are connected to respective base electrodes of transistor 3. Reference B designates an output terminal of transistor 3. FIG. 2 is a characteristic chart in which the periodic signal pulses P are illustrated with the abscissa corresponding to the time $t$ and the ordinate corresponding to the voltage $V_1$ at output terminal B. In the specific circuit shown in FIG. 3, a plurality of capacitors $2'$, $2''$, . . . corresponding to capacitor 2 are selectively connected in series with photoconductor 1 by a changeover switch 6 in accordance with the individual values or relative values of the photosensitivity of the film used and the preset diaphragm. An SCR or silicon controlled rectifier 8 has its control terminals connected to the output terminal B of transistor 3 through a switch 7 of the normally opened type which is adapted to be closed by the shutter release operation. SCR 8 is connected to an energizing source in series with an electromagnetic relay 9 which functions to start the shutter opening. Another silicon controlled rectifier or SCR 12 whose control electrodes are connected to an adjustable potential dividing point C of a control bias resistor 11 of control element 8 is connected in series as a switching element into a circuit with and to energize another electromagnetic relay 10 which functions to start the shutter closure. SCR 12 has another control terminal bias resistor 13 which is shorted upon closure of a switch 14 responsive to electromagnetic relay 9 being in a deenergized or non-operative condition. A voltage source battery is designated by numerical reference 15 and a source switch by numerical reference 16.

In the embodiment illustrated by FIG. 4, a resistor 17 serving as a diode bias voltage forming circuit is series connected to the cathode of the first SCR 8 in the network of the previous embodiment and functions as a control means for the second SCR 12 as in the previous embodiment and its voltage controlled point D at the electrode of SCR 8 is connected through a diode 18 to the gate of second SCR 12. The other circuit elements having the same functions as those in the previous embodiment are designated by the similar numerical or alphabetic references.

Figure 5:
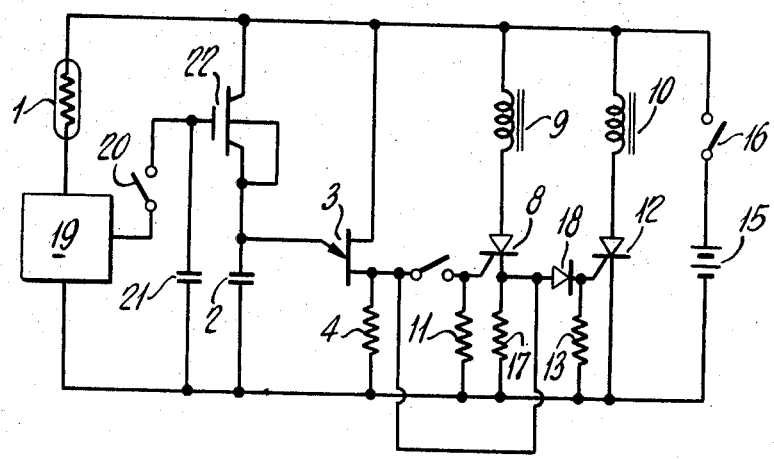
FIG. 5 is a circuit diagram of a further embodiment of the present invention.

Referring now to FIG. 5 illustrating a further embodiment of the present invention, a photoconductor 1 located in path of light coming through the camera objective from an object to be photographed is connected in series with a log converting circuit 19 of known construction in a manner that a photoelectric current converted by circuit 19 is applied to a memory capacitor 21 immediately before the shutter opening release, for example, through a normally closed switch 20 which is adapted to be opened in response to the first half stage of depressing the shutter release button. A field effect transistor 22 serving as a current control element of high input impedance is controlled by memory capacitor 21 as the gate input, whereby to control the current to timing capacitor 2 in the previous embodiments. The other circuit elements having the same functions as those in the previous embodiment are designated by the similar numerical or alphabetic references.

Considering the operation of the improved shutter control networks described above, upon application of an energizing voltage V to the frequency converting section or relaxation oscillator pulse generator of FIG. 1, the capacitor is charged with current at a rate responsive to the illumination intensity of the object to be photographed under control of photoconductor 1 and, when terminal voltage $V_E$ increases with time to a predetermined level, the emitter and the negative electrode of unijunction transistor 3 receiving voltage $V_E$ on the emitter become conductive whereby the electric charge on capacitor 2 is discharged through the resistance 4. At this point, a pulse P as represented in FIG. 2 occurs at the output terminal B. More specifically, transistor 3 becomes conductive and the capacitor is rapidly discharged and transistor 3 restored to a non-conductive condition. The capacitor 2 continues to be charged during this series of operations and its discharge as above mentioned will be repeated every time the electric charge of said capacitor 2 increases up to said predetermined level. The pulse as represented by curves P in FIG. 2 thus repeatedly occurs at output terminal B with a period T which, in turn, may be expressed by the following equation so far as values of resistances 4 and 5 are properly selected in the known manner:

$$T = RC \ln(1/1-n)$$

where $R$ indicates resistance value of the photoconductor 1, $C$ capacity of the capacitor 2 and $n$ stand-off ratio of the unijunction transistor 3.

The period $T$ controlled here, as obvious from the above equation, does not involve as a factor the source voltage V and is determined simply by the RC of the timing circuit without being influenced by variations of said source voltage V. The period $T$ is, furthermore, insignificantly influenced by variations of ambient temperature due to a preferred thermal characteristic of transistor 3 and few factors determining the period. The capacity $C$ of capacitor 2 may be varied according to parameters such as the photosensitivity of film used to vary the period T also according to said requirement since said period T is determined by the RC of the timing circuit.

In the embodiment illustrated in FIG. 3 wherein the shutter control is accomplished by first and second pulses having said period T, the capacitor of a group of capacitors 2, $2'$, $2''$, . . . which correspond to the photosensitivity value of the film used, for example, the capacitor $2'$ is inserted by operation of the change-over switch 6 into the timing circuit and the source switch 16 is closed in this condition whereby the pulses of a period T which depends upon the photosensitivity value of film used and the illumination intensity of the object to be photographed successively occur at the output terminal B. Then the switch 7 is closed by the operation of the shutter release button whereby pulses are successively applied to the gate of the SCR 8 which is, in turn, shifted by the first said pulses from a non-conductive to a conductive state, and thus the electromagnetic relay 9 is energized and actuated so as to start the shutter opening. It is noted that the first pulse is applied to the gate of the first silicon controlled rectifier 8 as well as to the gate of the second silicon controlled rectifier 12. If the first silicon controlled rectifier 8 is not conductive when said first pulse is applied thereto, the switch 14 operating in response to the electromagnetic relay 9 is in closed position so as to short the control pole bias resistance 13, so that said second silicon controlled rectifier 12 remains non-conductive without ignition as seen in FIG. 3. In the embodiment shown in FIG. 4, the first silicon control element 8 becomes conductive upon application of the first pulse, while said second silicon controlled rectifier 12 remains non-conductive even when said first pulse is applied thereto, since the diode 18 included in the input circuit to said second silicon controlled rectifier 12 is not provided with a sufficient forward bias and is far from the variation range wherein current sharply increases.

Upon the application of the first pulse the first silicon controlled rectifier 8 alone is conductive and the electromagnetic relay 9 actuates shutter opening release. Upon application of the second pulse a period T after said first pulse the first silicon controlled rectifier 8 is maintained conductive while said second pulse applied by the switch 14 opened in response to the operation of electromagnetic relay 9 causes ignition of SCR 12 under sufficient bias, so that the electromagnetic relay 10 operates to actuate the shutter closure release. In the embodiment shown in FIG. 4, a bias voltage of the extent near the range wherein forward voltage of the diode 18 sharply increases is present at the point P, so that application of the second pulse causes ignition of the second silicon controlled rectifier 12 and thereby said element 12 becomes conductive, resulting in operation of said electromagnetic relay 10 for shutter closure release.

The shutter of this invention thus accomplishes an automatic control for proper exposurement wherein the shutter opening time is controlled by a period T of the frequency converting section that depends upon illumination intensity of an object to be photographed.

The network shown in FIG. 5 is useful in single lens reflex cameras of the TTL type. In this embodiment, when the source switch 16 is closed in association with the first half of the depressing of the shutter release button, the photoconductor 1 is exposed to light coming through the camera objective from an object to be photographed and the photoelectric current converted by the log converting section 19 is stored through switch 20 in the memory capacitor 21. The field effect transistor 22 charges the capacitor 2 with a current controlled according to the terminal voltage of memory capacitor 21. The exposure control is accomplished, as in the last embodiment, with the operation of the frequency conversion section and by the shutter control of the RC timing circuit depending on interpole resistance R of transistor 22 and capacitor C of capacitor 2 and the unijunction transistor 3.

The silicon controlled rectifier 8 and 12 in each of the embodiments described above are kept conductive once they have become conductive, so that these elements 8 and 12 are restored to a non-conductive condition while the other operative sections also are restored to the initial condition by an operation such as the opening of the source switch 16 in association with film advancing operation for the next shot or the final operation of the shutter closure after completion of the shutter release, whereby the operation cycle described above can be repeated.

With the electric shutter of this invention, as described hereinbefore, the frequency converting section comprising the timing circuit and the unijunction transistor both being adapted to respond to illumination intensity of object to be photographed, provides periodic signals in accordance with said illumination intensity without being influenced by the source voltage and being almost free from any influence by ambient temperature variations also, so that the signals for control of exposure time are obtained with the highest accuracy. Further, the shutter control mechanism is so arranged that shutter opening and closure are both started by the corresponding electromagnetic mechanism in order that any error of exposure time due to the delay of said corresponding electromagnetic mechanism may be offset by a delay of the other electromagnetic mechanism being identical to that of the corresponding electromagnetic mechanism and therefore exposure time is determined based on said control signals of the highest accuracy as above mentioned, resulting in very accurate control of exposure time. Furthermore, the first switching element for starting the shutter opening and the second switching element for starting the shutter closure are so arranged that said second element can be operated only when these switching elements have been shifted by the operation of the first element to the shutter opening condition and thus said first and second switching elements are precisely operated by the first and second pulses of the periodic signals, respectively, so that these switching elements are always operated in a proper manner without erroneous operation of shutter control. Furthermore, the capacitors included in said timing circuit are exchangeably circuit-connected in a manner that photographing parameters other than illumination intensity of object to be photographed, such as the photosensitivity value of film used, or the set value of the diaphragm or the relationship of these values, may added to the control operation and exposure time control of TTL type is possible.

It should be noted that, although a unijunction transistor is used as the frequency converting section in embodiments of the shutter according to this invention, the desired time control can be accomplished also by use of a non-stable multi-vibrator circuit having the same frequency converting function as that of said unijunction transistor with the similarly high accuracy. And with the shutter of this invention, it is also possible to predict the exposure time to be controlled by displaying the output of the frequency converting section including said unijunction transistor using a digital analogue display device of well known art.

Figure 6:
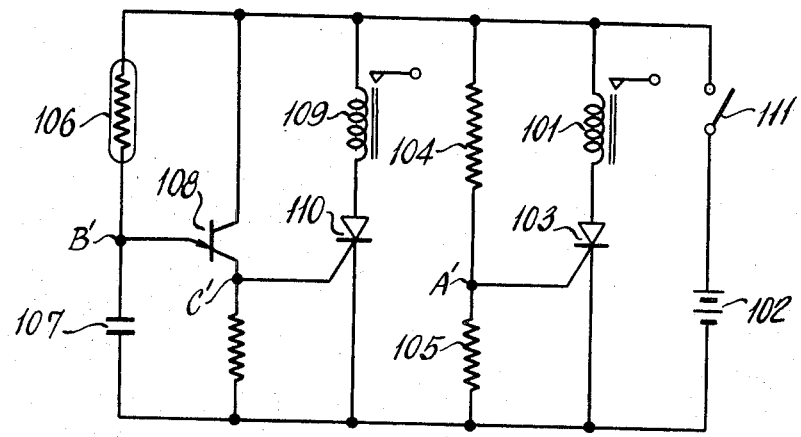
FIG. 6 is a circuit diagram of still a further embodiment of the present invention.
Figure 7:
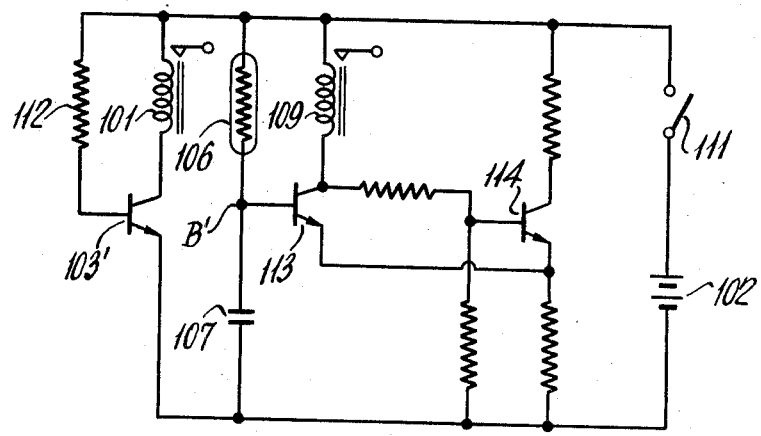
FIG. 7 is a circuit diagram illustrating another embodiment of the invention.

Now referring to FIGS. 6 and 7 of the drawings illustrating other embodiments of the present invention, a silicon controlled rectifier or SCR 103 serving as a switching element is serially connected in a circuit including therein a battery 102 as a power source for energization of an electromagnetic relay 101 and a main switch 111. Resistances 104 and 105 serially connected to each other at point A' constitute a bleeder circuit across battery 102 and point A' is connected to the gate of silicon controlled rectifier 103. Numerical reference 106 designates a photoconductor which is exposed and responsive to the illumination intensity of object to be photographed. A timing capacitor 107 is serially connected in a photoelectric circuit including battery 102 as a power source. The emitter of a unijunction transistor 108 is connected to the junction point B' of photoconductor 106 and timing capacitor 107. Another silicon controlled rectifier 110 is serially connected in a circuit including battery 102 as a power source for energization of another electromagnetic relay 109 to actuate the shutter closure release. To the gate of silicon controlled rectifier 110 the output electrode of transistor 108 is connected. The starting switch 111 serially connected to battery 102 is adapted to be closed with the depression of the shutter release button. In the embodiment of FIG. 7, a transistor 103' serving as a switching element is serially located in a circuit for energization of the electromagnetic relay 101 to initiate the shutter opening release and a circuit for control of energization of electromagnetic relay 101 is constituted by the connection of the base of transistor 103' through a resistance 112 to one terminal of battery 102. A Schmidt circuit including transistors 113 and 114 is employed as the circuit for the control of the energization of the electromagnetic relay 109 to initiate the shutter closure release and electromagnetic relay 109 is connected to the collector of transistor 113.

In the operation of the shutter circuits illustrated in FIGS. 6 and 7, following the operations preparatory to photographing such as framing the object to be photographed or focussing the depression of the shutter release button closes the starting switch 111 thereby completing the energizing circuit for an operative circuit including the battery 102 as power source. The silicon controlled rectifier 103 is thus energized and has applied to its gate electrode a voltage divided from the source voltage under control of the resistances 104 and 105 and becomes conductive when said source voltage is of value enough to properly operate the switch circuit. Thus silicon controlled rectifier 103 energizes said electromagnetic relay 101 which effects the shutter opening release. At the same time, the timing capacitor 107 begins to be charged under current control of the photoconductor 106 which responds to the illumination intensity of the object to be photographed upon the closure of the starting switch, and when the terminal voltage of capacitor 107 reaches a predetermined value transistor 108 becomes conductive whereby said capacitor 107 is discharged. A pulse signal is thus formed at base C' of transistor 108. When the silicon controlled rectifier 110 becomes conductive upon application of this pulse signal to the control electrode thereof, the electromagnetic relay 109 is actuated to effect the shutter closure release.

In the above operation the pulse signal is formed at a time determined by the illumination intensity of the object to be photographed under control of the photoconductor 106. Both shutter opening and closure are accomplished by the electromagnetic relays 101 and 109, so that, if these electromagnetic relays 101 and 109 are of identical type, any delay operation of these electromagnetic relays 101 and 109 which would otherwise disadvantageously influence the time point of shutter opening is effectively offset for exposure time control by said pulse signal. Values of the resistances 104 and 105 constituting an input control circuit for the silicon control element 103 are properly selected so that the shutter opening may be started only when the source voltage is in proper condition at the moment of closure of said starting switch 111 or of the operation of the shutter release button. If the battery 102 is so consumed that the timer section can no longer operate in a proper manner for effecting the shutter closure release, the shutter opening is not accomplished and therefore any photographing failure due to erroneous operation of said timer section is avoided.

With the modified embodiment as illustrated in FIG. 7, the source voltage of the battery 102 under control of the resistance 112 is applied to base of the transistor 103' upon closure of the starting switch 111 and transistor 103' becomes conductive if the source voltage is within the proper range by value selection of resistance 112. Transistor 103' upon becoming conductive causes the electromagnetic relay 101 to effect the shutter opening release and simultaneously causes the Schmidt circuit to be reversely operated under control of the timing circuit including the photoconductor 106 in a manner that the electromagnetic relay 109 is operated to effect the shutter closure release after a time according to the illumination intensity of the object to be photographed has lapsed from the closure of starting switch 111. With this embodiment as with the last embodiment, any delay operation of the electromagnetic relays 101 and 109 that tends to influence the duration of shutter opening is effectively offset by each other for the proper exposure time control and, in addition, the shutter opening can be blocked when the battery 2 has already consumed.

Thus in the circuits of FIGS. 6 and 7, shutter opening is initiated by the electromagnetic relay 101 which is controlled by the silicon controlled rectifier 103 or the transistor 103' serving as a switching element of which the control electrodes receiving the source voltage for operating the device, while the shutter closure is started by the other electromagnetic relay 109 under control of the timer section, adapted to be operated concurrently with the section for starting the shutter opening, in accordance with illumination intensity of object to be photographed. Thus shutter operation occurs only when the source voltage is at a normal level and does not occur when said source voltage has dropped below normal due to causes such as consumption of the battery 102. Thus not only photographing failure due to erroneous control of exposure time under abnormal source voltage conditions can be avoided but also any additional structure such as a source voltage indicator as required by the electric shutter of the conventional type can be eliminated. Furthermore, shutter opening and closure are started by the respective electromagnetic relays 101 and 109, so that any influence of delay in operation in the electromagnetic starting upon control of exposure time can be effectively offset and the accurate control of exposure time achieved according to the illumination intensity of the object to be photographed.

It should be noted that, although the timer operating sections are described in the aforegoing description as the unijunction transistor 108 or the Schmidt circuit, a transistor timer mechanism of well known art may be employed as each of said timer operating sections.

While there have been described and illustrated preferred embodiments of the present invention it is apparent that numerous alterations, omissions and additions may be made without departing from the spirit thereof.

I claim:

1. A shutter timing mechanism comprising a variable resistor, a variable frequency oscillator having a single signal output, said signal comprised of a pulse train having a period responsive to the resistance of said variable resistor, and shutter timing means responsive to first and second successive pulses from said single signal output for respectively successively intiating the opening and closing of said shutter.

2. The shutter timing mechanism of claim 1 wherein said variable resistor comprises a photoconductor.

3. The shutter timing mechanism of claim 2 wherein said oscillator is a relaxation oscillator comprising a timing network including a timing capacitor and said photoconductor.

4. The shutter timing mechanism of claim 3 wherein said oscillator comprises a unijunction transistor and means connecting said photoconductor between the emitter and one base of said unijunction transistor and means for connecting said capacitor between said emitter and the other base of said unijunction transistor.

5. The shutter timing mechanism of claim 1 wherein said oscillator is a relaxation oscillator comprising a timing network including a high input impedance amplifier, a capacitor connected to the input of said amplifier, means connecting said variable resistor to the input of said amplifier, said oscillator period being responsive to the output of said amplifier.

6. The shutter timing mechanism of claim 1 comprising means including a battery and a switch for selectively energizing said oscillator, said first and second pulses being respectively the initial pulse and the next successive pulse generated by said oscillator upon energization thereof.

7. The shutter timing network of claim 3 wherein said photoconductor and timing capacitor are connected in series and said generator includes a unijunction transistor whose input responds to the charge on said capacitor.

8. The shutter timing mechanism of claim 3 wherein said shutter timing means comprises a first control network responsive to the output of said oscillator and a shutter opening release means responsive to the output of said first control network, a second control network responsive to said oscillator output and said first control means, and a shutter closure release means responsive to said second control network.

9. The shutter timing network of claim 8 wherein said shutter opening release means and said shutter closing release means comprise electromagnetic devices.

10. The shutter timing network of claim 3 including a plurality of said timing capacitors and means for connecting selected of said capacitors in said timing network.

11. A shutter timing mechanism comprising a variable frequency oscillator, having a single signal output, said signal comprised of a pulse train, means for varying the frequency of said oscillator, first shutter control means responsive to a first pulse from said oscillator for initiating the opening said shutter and second shutter control means responsive to a second pulse from said oscillator after said first pulse for initiating the closing of said shutter.

* * * * *